United States Patent [19]

Blumenthal et al.

[11] Patent Number: 4,749,676
[45] Date of Patent: Jun. 7, 1988

[54] PROCESS FOR THE PREPARATION OF A CRYSTALLINE, SWELLABLE SHEET SILICATE OF THE SAPONITE TYPE

[75] Inventors: Thomas Blumenthal, Frankfurt am Main; Hans-Jürgen Kalz, Liederbach, both of Fed. Rep. of Germany

[73] Assignee: Hoechst Aktiengesellschaft, Frankfurt am Main, Fed. Rep. of Germany

[21] Appl. No.: 934,113

[22] Filed: Nov. 24, 1986

[30] Foreign Application Priority Data

Nov. 26, 1985 [DE] Fed. Rep. of Germany ....... 3541666

[51] Int. Cl.$^4$ ............................................. B01J 21/16
[52] U.S. Cl. .................................. 502/251; 423/326; 423/327; 423/331; 502/68; 502/84; 502/80; 502/250
[58] Field of Search ................... 502/80, 250, 251, 68, 502/84; 423/326, 327, 331

[56] References Cited

U.S. PATENT DOCUMENTS 3,844,978 10/1974 Hickson ............................ 423/331
3,844,979 10/1974 Hickson ............................ 423/331

FOREIGN PATENT DOCUMENTS 8176116 10/1983 Japan .................................. 502/251

Primary Examiner—Asok Pal

[57] ABSTRACT

A crystalline swellable sheet silicate of the saponite type, of the formula $$[Mg_6(Si_{8-x}Al_x)O_{20}(OH)_4]^{x-} \cdot (x/z)M^{z+} \cdot n\,H_2O$$

in which
x is a number which is less than 1.5 but at least 0.2,
z is an integer from 1 to 3,
M denotes a cation having the valency of z and
n is a number less than 20, is prepared. For this purpose, an aqueous solution or suspension containing magnesium ions, a silica source, an alumina source and a sodium oxide source are combined. The atomic ratio of Mg/Si and Mg/Al used in this procedure correspond to the composition of the desired saponite. The atomic ration (Na−Al):(Mg+Si+3/2.Al) should be between x/5 and 1, Na denoting the amount of sodium atoms present in alkaline compounds. The pH of the reaction mixture should be at least 9.0. The crystals of the resulting synthetic saponite in the sodium form are separated off from the mother liquor and, if appropriate, treated with an aqueous solution or suspension of a salt having the cation $M^{z+}$, and, when cation exchange is complete, are separated off from the aqueous phase.

8 Claims, No Drawings

PROCESS FOR THE PREPARATION OF A CRYSTALLINE, SWELLABLE SHEET SILICATE OF THE SAPONITE TYPE

The present invention relates to a process for the preparation of a synthetic, crystalline, swellable sheet silicate of the saponite type from simple basic chemicals at elevated temperature.

Saponites are trioctahedral sheet silicates of the smectite type, of the general formula $$[Mg_6(Si_{8-x}Al_x)O_{20}(OH)_4]^{x-} \cdot (x/z)M^{z+} \cdot nH_2O,$$

wherein x is less than 1.2, z can be 1, 2 or 3 and M is a cation having a valency of z. n designates a water content dependent on the degree of drying.

Because of their pronounced swelling capacity and their cation exchange capacity, sheet silicates of the smectite type constitute valuable raw materials for a variety of fields of use.

The hydrothermal synthesis of such sheet silicates was described by W. NOLL (Chemie der Erde 10, 1936, page 9 et seq.). The process described there, in which the reaction was carried out in dilute aqueous solution under superatmospheric pressure, has since been improved many times. H. STRESE and U. HOFMANN investigated the preparation of (aluminum-free) "hectorites" (Z. anorg. allg. Chem. 247, 1941, page 65 et seq.). The further development then concentrated on the optimization of the hectorite syntheses.

In the preparation of hectorites by the process of German Offenlegungsschrift No. 3,207,886, the addition of the components and the reaction under pressure are carried out at temperatures of at least 110° C. To obtain particularly readily crystallizing products, a fluoride is added.

The group comprising the saponites differs from that comprising the hectorites in that fluorine and lithium are completely absent and aluminum is present. Hence the layer charge is produced not mainly by the isomorphous replacement of magnesium in the octahedral layers but by replacement of silicon in the tetrahedral layers of the three-layer mineral, for example by aluminum. Since neither fluorine nor chlorine is required for the preparation of the saponites, these swellable sheet silicates are particularly interesting.

German Offenlegungsschrift No. 2,319,199 describes the hydrothermal synthesis of a smectite which is related to saponite and generally contains fluoride but is always contaminated with substantial amounts of magnesium oxide or magnesium hydroxide.

H. SUQUET et al. synthesized saponites having different layer charges by reaction of the freshly prepared oxides of silicon, aluminum and magnesium at 450° C. for a reaction time of 15 days (Clays, Clay Miner. 25, 1977, page 231 et seq.). U.S. Pat. No. 3,844,979 describes the preparation of (preferably once again fluoride-containing) saponites, a mixture of water, silica, alumina and magnesium oxide and a monovalent to trivalent cation (preferably ammonium) with an anion such hydroxide, fluoride, acetate or chloride first being prepared as a starting suspension. The product is formed from the resulting precipitate by aging and subsequent heating at 290°–370° C. under pressure. It is obtained directly by drying the reaction mixture, preferably in vacuo.

However, all these processes require very high reaction temperatures.

Finally, German Offenlegungsschrift No. 3,149,131 describes a similar process. Here too, the oxides of sodium, magnesium, silicon and aluminum are mixed in aqueous solution, the mixture is subjected to a very shear force (for example at 3000 rpm), and crystallization is effected by stirring for several hours at elevated temperature in an alkaline medium (preferably at pH 11–13). Under atmospheric pressure, a crystallization period of at least one day is necessary. Sparingly soluble oxides are preferably employed; for example, magnesium hydroxide or readily soluble MgO is preferred as the magnesium component. ponent.

In order to maintain the desired molar ratio of silica to magnesium oxide in the product, the silicon component must be used in excess (1 to 2.5 moles of $SiO_2$ per mole of MgO in the mixture for 0.8 to 1.3 moles of $SiO_2$ per mole of MgO in the product; in the only example, this ratio is 1:1 in the mixture and 0.91:1 in the product). $SiO_2$ remains in the mother liquor. However, the synthetic sheet silicate formed is not characterized in more detail in German Offenlegungsschrift No. 3,149,131 but is directly processed further by treatment with organic cations.

It was therefore the object to provide a simple process for the preparation of synthetic sheet silicates of the saponite type, the said process giving saponites which possess good processing properties and a high swelling capacity. In this process, neither very high temperatures nor the use of a shear apparatus should be required.

A process for the preparation of a crystalline swellable sheet silicate of the saponite type of the formula $$[Mg_6(Si_{8-x}Al_x)O_{20}(OH)_4]^{x-} \cdot (x/z)M^{z+} \cdot nH_2O$$

in which x is a number which is less than 1.5 but at least 0.2,
z is an integer from 1 to 3,
M is a cation having a valency z and
n is a number which is less than 20, has now been found, an aqueous solution of suspension containing magnesium ions, a silica source, an alumina source and a sodium oxide source being combined and the Mg/Si and the Mg/Al atomic ratio used corresponding to the composition of the desired saponite, wherein the atomic ratio $$(Na-Al):(Mg+Si+3/2.Al)$$

is between x/5 and 1, Na denoting the amount of sodium atoms present in alkaline compounds and the pH of the reaction mixture being at least 9.0, the crystals of the resulting synthetic saponite are separated off in the sodium form from the mother liquor and, if appropriate, treated with an aqueous solution or suspension of a salt with the cation $M^{z+}$, and separated off from the aqueous phase when cation exchange is complete. Alkaline sodium compounds are the silicate, aluminate, carbonate and hydroxide. This amount is reduced where it is consumed for neutralizing any acidic compounds of magnesium (for example the chloride) or aluminum (for example the sulfate) with formation of the hydroxides.

The value of x is preferably 0.2 to 1.4, in particular 0.3 to 1.3. The value of n depends on the degree of drying of the resulting sheet silicate. It is not critical with regard to the exchange capacity of the sheet silicate.

However, as n decreases, the content of active substance increases slightly. The swelling capacity, in particular the swelling rate, becomes somewhat smaller when drying is carried out under harsher conditions. Preferred values of n are less than 15, in particular less than 10 and in general greater than 2. The aqueous solution or suspension which contains magnesium ions is preferably derived from readily soluble inorganic salts of magnesium, such as magnesium chloride, sulfate or nitrate. However, it is also possible to employ other magnesium compounds which are soluble in hot water, for example freshly precipitated magnesium hydroxide. It is preferable if the compounds employed have a solubility of at least 50 g of magnesium per liter at 100° C. This condition is not satisfied by magnesium hydroxide or by magnesium hydroxide which has not been calcined.

The silica source used can be a silica sol or an aqueous solution or suspension of potassium or sodium waterglass or another soluble silicon-oxygen compound.

Aqueous solutions or suspensions of alumina, aluminum hydroxide or sodium aluminate or of other soluble aluminum compounds are employed as the alumina source. For example, potassium alum can be used alone. However, additional amounts of basic compounds are required in this case in order to achieve the desired pH.

Aqueous solutions or suspensions of compounds which contain sodium ions, in particular those which additionally contain hydroxyl ions, can be used as the sodium oxide source. Examples of compounds which can be used are sodium carbonate, sodium hydroxide, sodium silicate and sodium aluminate. Sodium carbonate and sodium hydroxide are preferably used in a molar ratio of 1:5 to 1:3, in addition to sodium silicate and sodium aluminate. It is also possible to use small amounts of sodium salts, such as sodium sulfate, when in addition other basic compounds, such as potassium hydroxide, ensure that the desired pH is reached.

In the process according to the invention, the molar ratio $Na_2O/MgO$ in the mixture is higher than in the process of German Offenlegungsschrift No. 3,149,131. A preferred range for the molar ratio $Na_2O/MgO$ is 1 to 5.0, in particular 1.2 to 3.0.

The pH to be observed for the reaction mixture is preferably at least 9.5, in particular at least 10. In some cases the pH falls slightly during the reaction. If the pH of the mother liquor is 8.5 when the reaction is complete and the sheet silicate has been separated off, this is a sign that the pH of the reaction solution should have been increased at the beginning of the reaction.

With regard to the addition of the components, it has proven useful first to heat an aqueous solution or suspension of the magnesium salt to a temperature of 110° to 373° C., in particular 120° to 300° C. under autogenous pressure, and to add the silica source, the alumina source and the sodium oxide source in the form of aqueous solutions or suspensions in this temperature range, preferably with constant thorough mixing, and to ensure that the sodium oxide source and the alumina source are not added before the silica source. Particularly preferred lower limits for the temperature intervals during addition of the components to the magnesium salt are 130° C., 150° C. and 170° C.; particularly preferred upper limits are 250° C., 230° C. and 210° C. The mixture is then again kept for a prolonged period in the temperature range of 110° to 373° C., preferably in the range of 130° to 300° C., in particular in the range of 150° to 250° C.

The addition of the silica source, the alumina source and the sodium oxide source can be effected very rapidly; preferably, the addition of the individual components takes no more than one hour. It is advantageous if some ($\frac{1}{4}$ to $\frac{1}{2}$) of the sodium oxide source is added together with the silica source and the remainder of the sodium oxide source is added together with the alumina source. Where heated solutions or suspensions are metered in, the procedure can be carried out rapidly. In many cases, the heat of solution evolved during the preparation of the solutions or suspensions of the alkaline starting materials is sufficient. In order to achieve good mixing, it is advantageous to stir the mixture during the addition of the components, for example at 50 to 200 rpm. High shear, as described in, for example, German Offenlegungsschrift No. 3,149,131, is not necessary. Stirring has only slight advantages with regard to the subsequent reaction. It is therefore preferable to carry out stirring during the reaction at less than 50 rpm.

The addition of the individual components in the stated temperature range must be carried out under pressure. When the components are metered in, only a moderate pressure is possible in some cases, owing to the apparatus. In these cases, it is preferable if the temperature (and therefore the pressure) is higher during the actual reaction than during the addition of the components.

The duration of the reaction in which the saponite is formed is dependent on the temperature used and the desired properties. At relatively low temperature, relatively high aluminum content and relatively high desired swellability, a longer reaction time is advantageous. In general, reaction times of 0.5 to 10 hours are sufficient. For example, at a temperature of 220° C., a low concentration (about 20 g/l of $SiO_2+Al_2O_3$), a low aluminum content (Si:Al=7.8:0.2) and a high pH (above 12), a reaction time of 1 hour is sufficient if only moderately good swellability is to be achieved. The reaction is preferably carried out until at least 50 g/l of crystalline sheet silicate of the saponite type, preferably 60 to 120 g/l of saponite, are present in the reaction mixture.

The concentration of the reactants is not critical. The sum of the concentrations of the reactants alumina and silica can be, for example, 1 to 200 g/l. However, an advantage of the process according to the invention is that a relatively high concentration can be employed. It is preferable if the amounts of silica plus alumina per liter of reaction mixture are together at least 20 g/l in particular 35 to 110 g/l preferably 35 to 80 g/l. Suspensions containing more than 5% by weight of saponite can be obtained without difficulty.

When the reaction is complete, the mixture if cooled to temperatures below 100° C. and the solid mixture separated off in the mother liquor. The residue contains not only saponite but also soluble salts whose constitution depends on the starting materials. When magnesium sulfate and sodium waterglass are used, for example, sodium sulfate is present in addition to saponite. The soluble salts can be removed completely by washing with water. However, this removal is not required for many possible applications; thus, for example, cation exchange with inorganic cations (for example heavy metal cations) or organic cations (for example tetraalkylammonium cations) can be carried out directly on the moist filter cake, for example in water/alcohol mixtures as solvents. If the reaction mixture is intended for detergent formulations, it can be partially dewatered and then added directly to a detergent slurry (containing water, anionic surfactants, nonionic surfactants, bleaching agents and complex formers, such as polyphosphate and others), which can then be dried, for example by spray drying.

The sheet silicate prepared by the process according to the invention has a cation exchange capacity of 25($x=0.2$, M=Na) to 150($x=1.5$, M=Na) milliequivalents/100 g. The exchange capacity is dependent on the layer charge and can therefore be substantially influenced by the aluminum content of the reaction mixture ("x" in the general formula). The rheological properties of the product prepared are dependent on the swelling capacity, which can be influenced to a very substantial extent via the pH of the reaction mixture. The higher this pH the better is the swelling capacity. Products having a low exchange capacity generally have a better swelling capacity than those with a higher exchange capacity; as the aluminum content of the product increases, higher and higher pH values are required in order to achieve a satisfactory swelling capacity.

After thorough washing and drying, the saponites prepared by the process accorcing to the invention can be readily dispersed in water with formation of a sol. The sol can be converted to a thixotropic gel having a high Bingham yield point, for example by adding an electrolyte.

In the saponite initially precipitated, the cation M is substantially sodium. However, other synthetic saponites can be prepared by treatment with aqueous solutions or suspensions of salts which contain a different cation M. For example, the treatment can be carried out using salts of potassium, the alkaline earth metals, aluminum or organic cations. Exchange with the new cation can be carried out before or after washing of the saponite initially synthesized. In this procedure, water can be used as a reactant. However, the dry saponite is also capable of undergoing cation exchange, particularly when organic solvents are used as the reaction medium. Exchange with heavy metal cations gives products which can be used as catalyst, similarly to zeolites.

Exchange with organic cations gives valuable gel formers for organic systems, which are suitable for a large number of intended uses. The presence of organic cations improves swellability and flow behavior in organic solvents. For example, trialkylsulfonium cations or tetraalkylphosphonium cations or mixtures of these can be used. Tetrasubstituted organic ammonium salts, in particular tetraalkylammonium salts, are preferred. Exchange with organic cations is familiar in principle to the skilled worker, for example from German Auslegeschrift No. 1,667,502. Instead of the tetraalkylammonium salts, it is also possible to use the corresponding trialkylamines.

The saponite suspensions (having an inorganic cation) prepared in the process according to the invention are particularly suitable for use as builders in detergent formulations.

The use of saponites alone as softeners in detergents is described in German Offenlegungsschrift No. 2,334,899. According to German Offenlegungsschrift No. 2,503,585, bentonites (natural smectites) having quaternary ammonium cations are employed in detergents. However, smectite-like clays in conjunction with tertiary amines are also suitable for this purpose. The effect of smectites together with the tertiary amines and quaternary ammonium salts is described in European patent application No. 00 26 528.

It is an advantage that the saponites prepared according to the invention do not have any troublesome natural color, in contrast to the naturally occurring, generally iron-containing smectites. Another advantage is that the product prepared contains neither fluoride ions or lithium ions, in contrast to synthetic hectorites. This facilitates their use in household detergents. A further advantage of the process according to the invention is that the silica used is present virtually quantitatively in the end product.

The invention is illustrated in detail by the examples below.

EXAMPLE 1

296.2 g of $MgSO_4 \cdot 7 H_2O$ are dissolved in 600 ml of water and heated to 160° C. in an autoclave. A mixture of 312 g of sodium waterglass solution (27.8% of $SiO_2$; 8.3% of $Na_2O$) and 8 g of NaOH in 800 ml of water are pumped into the solution, while stirring. A mixture of 50 g of $Na_2CO_3$, 40 g of NaOH and 25.2 g of sodium aluminate (54% of $Al_2O_3$; 45% of $Na_2O$) in 500 ml of water is then added, the temperature still being kept constant (160°+5° C.). The autoclave is heated to 195° C. and the stirrer switched off. After 5 hours, the heating is switched off, the reaction mixture is cooled and the product is washed several times with water on a suction filter. After drying at 140° C., 158 g of product remain (=97% yield, based on $SiO_2$). Other reaction parameters are shown in Table 1, and the product properties are given in Table 2.

EXAMPLE 2

300 g of $MgSO_4 \cdot 7 H_2O$ are dissolved in 500 ml of water and heated to 160° C. in an autoclave. A mixture of 303 g of sodium waterglass solution (from Example 1) and 8 g of NaOH in 500 ml of water is pumped into this solution at this temperature, while stirring, followed by a mixture of 40 g of $Na_2CO_3$, 65 g of NaOH and 19 g of sodium aluminate (from Example 1) in 500 ml of water. The temperature is increased to 195° C. and, without stirring, kept constant for 4 hours. Thereafter, the reaction mixture is cooled and the product is washed several times with water over a suction filter. After the product has been dried at 140° C., the yield is 160 g (97%).

EXAMPLE 3

300 g of $MgSO_4 \cdot 7 H_2O$ are dissolved in 400 ml of water and heated to 160° C. in an autoclave. 298 g of sodium waterglass solution (from Example 1) and 8 g of NaOH in 200 ml of water are pumped into the solution at 160°±5° C., while stirring. Thereafter, a mixture of 40 g of $Na_2CO_3$, 65 g of NaOH and 23 g of sodium aluminate (from Example 1) in 400 ml of water is metered in. The temperature is increased to 195° C., the stirrer is switched off and the reaction mixture is kept at this temperature for 4 hours. Working up (cooling, washing and drying) is carried out as in Example 1. The yield is 163 g (98%).

EXAMPLE 4

25.6 kg of $MgSO_4 \cdot 7 H_2O$ in 50 l of water are heated to 160° C. in an autoclave. A mixture of 26.5 kg of sodium waterglass solution (from Example 1), 680 g of NaOH and 68 l of water is pumped in at constant temperature (160°±5° C.) in the course of about 40 minutes, while stirring. Thereafter, a mixture of 4.3 kg of Na$_2$CO$_3$ and 3.4 kg of NaOH and 1295 g of sodium aluminate (from Example 1) in 40 l of water is pumped in at constant temperature (160°±5° C.) in the course of about 20 minutes. The reaction mixture is heated to 200° C. under autogenous pressure, and the stirrer is adjusted to about 50 rpm. After 4 hours, the autoclave is cooled and the resulting suspension is partially dewatered over a filter. The filter cake obtained (79.4 kg) is compact and has a water content of 75.0% and a saponite content of 16.6% (=97% yield). In the mother liquor separated off, neither aluminum nor magnesium can be detected by complexometric titration; the SiO$_2$ content is 77 mg/l (in the reaction mixture: 37,000 mg/l). After thorough washing and drying, the product gives an X-ray diffraction pattern typical of saponites.

EXAMPLE 5 (Comparative Example with Reverse Sequence)

The reaction of Example 2 is carried out in reverse sequence, i.e. a mixture of Na$_2$CO$_3$, NaOH and sodium aluminate is initially taken and heated. The mixture of sodium waterglass solution and NaOH is metered into the above mixture, followed by the MgSO$_4$ solution. The reaction is carried out according to Example 2. Although the product formed also gives a saponite-type X-ray diffraction pattern to a 1st approximation, the (060) reflection has much greater half width (=poorer crystallinity). Moreover, it has a substantially lower exchange capacity compared with Example 2, and a poorer swellability, and does not form a thixotropic gel in 2% strength aqueous suspension.

EXAMPLE 6 (Comparative Example, Excessively Low Na$_2$O excess)

123.4 g of MgCl$_2$.6 H$_2$O are dissolved in 500 ml of water and heated to 140° C. in an autoclave. A mixture of 156 g of sodium waterglass solution (from Example 1) and 800 ml of water is first metered in (at 140°±5° C.), followed by a mixture of 45 g of Na$_2$CO$_3$ and 7.6 g of sodium aluminate (from Example 1) and 500 ml of water. The temperature is increased to 180° C. and the stirrer is adjusted to about 50 rpm. After 4 hours, the mixture is cooled and the product is washed several times with water on a suction filter and is dried at 140° C. The yield is 80 g (98%). The product exhibits poorer crystallinity in the X-ray diffractin pattern compared with Example 1, a lower exchange capacity and a substantially poorer swelling capacity. It too does not form a gel in aqueous suspension.

TABLE 1

| | | Reactants | | | |
|---|---|---|---|---|---|
| Example | x | (Na—Al): (Mg + Si + 3/2Al) | pH value after cooling | Mixture SiO$_2$ + Al$_2$O$_3$ [g/l] | Concentration of saponite [g/l] |
| 1 | 0.8 | 0.22 | 9.9 | 40 | 67 |
| 2 | 1.0 | 0.34 | 13.2 | 48 | 81 |
| 3 | 1.2 | 0.34 | 13.4 | 65 | 109 |
| 4 | 0.8 | 0.22 | 9.9 | 41 | 67 |
| 5 | 1.0 | 0.34 | 13.0 | 48 | 81 |
| 6 | 0.8 | 0.06 | 8.9 | 22 | 37 |

TABLE 2

| | | Properties | | | |
|---|---|---|---|---|---|
| Example | (060) half width | Exchange capacity [meq/100 g] | Enslin value [ml. 100/g] | Optical density | Bingham yield point [dyn/cm$^2$] |
| 1 | 1.1 | 80 | 2280 | 13% | 235 |
| 2 | 1.1 | 100 | 2090 | 26 | 283 |
| 3 | 0.9 | 118 | 1190 | 3 | 174 |
| 4 | 1.1 | 81 | 1665 | 6 | 156 |
| 5 | 1.6 | 85 | 870 | 0 | — |
| 6 | 1.4 | 64 | not determined | 0 | — |

We claim:
1. A process for the preparation of a crystalline, swellable synthetic sheet silicate having spaonite structure, of the formula

$$[Mg_6(Si_{8-x}Al_x)O_{20}(OH)_4]^{x-}.(x/z)M^{z+} n\ H_2O$$

in which
x is a number which is less than 1.5 but at least 0.2,
z is an integer from 1 to 3,
M denotes a cation having a valency of z and
n is a number less than 20, said process comprising the steps of:
heating an aqueous solution or suspension containing magnesium ions to a temperature of 110°–250° C. under autogenous pressure,
adding to the heated aqueous solution or suspension a silica source, an alumina source and a sodium oxide source; the amounts of magnesium ions, silica source, alumina source, and sodium oxide source being selected such that the Mg/Si and Mg/Al atomic ratios correspond to the composition of the desired trioctahedral silicate, the atomic ration $$(Na-Al):(Mg+Si+3/2.Al)$$

is between s/5 and 1, Na denoting the amount of sodium atoms present in alkaline compounds, the molar ratio of sodium oxide/magnesium oxide is from 1 to 5, and the pH of the reaction mixture is at least 9.0; and
the resulting crystals of the synthetic sheet silicate are separated off in the sodium form from the mother liquor, whereby M$^{z+}$ is Na$^+$.
2. The process as claimed in claim 1, wherein the said resulting crystals separated off from the mother liquor are treated with an aqueous solution or suspension of a salt having a cation M$^{z+}$ other than N$^+$, and, after ion exchange is complete, the thus-treated crystals are separated from the aqueous phase.
3. The process as claimed in claim 1, wherein the silica source, the alumina source, and the sodium oxide source are added in the form of their aqueous solutions or suspensions, the resulting mixture, which is at a temperature in the range of 110° to 373° C., is maintained in this temperature range for a prolonged period of time, and the silica source is added before either the alumina source or the sodium oxide source.
4. The process as claimed in claim 1, wherein the synthetic sheet silicate is a synthetic saponite.
5. The process as claimed in claim 1, wherein said sodium oxide source comprises a mixture of sodium carbonate and sodium hydroxide in a molar ration of 1:5 to 1:3.
6. The process as claimed in claim 1, wherein the aqueous solution or suspension containing magnesium ions is heated to 150°–250° C.
7. The process as claimed in claim 3, wherein said resulting mixture is maintained at a temperature of 150°–250° C. for a prolonged period of time.
8. The process as cliamed in claim 1, wherein the reaction mixture contains at least 20 g/l of (silica + alumina).

* * * * *